United States Patent
Desbiens

(10) Patent No.: US 7,873,634 B2
(45) Date of Patent: Jan. 18, 2011

(54) METHOD AND A SYSTEM FOR AUTOMATIC EVALUATION OF DIGITAL FILES

(75) Inventor: Jocelyn Desbiens, St-Lambert (CA)

(73) Assignee: Hitlab ULC., Montreal, Quebec (CA)

( * ) Notice: Subject to any disclaimer, the term of this patent is extended or adjusted under 35 U.S.C. 154(b) by 573 days.

(21) Appl. No.: 11/684,900

(22) Filed: Mar. 12, 2007

(65) Prior Publication Data

US 2008/0228744 A1    Sep. 18, 2008

(51) Int. Cl.
  *G06F 7/00*    (2006.01)
  *G06F 17/30*   (2006.01)
(52) U.S. Cl. .............. 707/731; 707/737; 707/740; 707/749; 707/752
(58) Field of Classification Search ............ 707/5, 707/1, 723, 731, 737, 740, 748, 749, 752
See application file for complete search history.

(56) References Cited

U.S. PATENT DOCUMENTS

| | | | |
|---|---|---|---|
| 5,616,876 A | 4/1997 | Cluts | |
| 5,918,223 A | 6/1999 | Blum et al. | |
| 6,539,395 B1* | 3/2003 | Gjerdingen et al. | 1/1 |
| 6,545,209 B1 | 4/2003 | Flannery et al. | |
| 6,748,395 B1 | 6/2004 | Picker et al. | |
| 6,941,301 B2* | 9/2005 | Ferguson et al. | 707/4 |
| 7,022,907 B2 | 4/2006 | Lu et al. | |
| 7,065,416 B2 | 6/2006 | Weare et al. | |
| 7,072,846 B1 | 7/2006 | Robinson | |
| 7,081,579 B2 | 7/2006 | Alcalde et al. | |
| 7,081,581 B2 | 7/2006 | Allamanche et al. | |
| 7,087,829 B2 | 8/2006 | Hasegawa et al. | |
| 7,091,409 B2 | 8/2006 | Li et al. | |
| 7,115,808 B2 | 10/2006 | Lu et al. | |
| 7,277,766 B1* | 10/2007 | Khan et al. | 700/94 |
| 7,304,229 B2 | 12/2007 | Chang | |
| 2002/0032698 A1* | 3/2002 | Cox | 707/501.1 |
| 2002/0083060 A1 | 6/2002 | Wang et al. | |
| 2002/0095421 A1* | 7/2002 | Koskas | 707/100 |
| 2003/0089218 A1 | 5/2003 | Gang et al. | |

(Continued)

FOREIGN PATENT DOCUMENTS

EP    1 307 833 B1    5/2003

(Continued)

OTHER PUBLICATIONS

Positioning Support in Pervasive Environments; Scuturici, V.-M.; Ejigu, D.; Pervasive Services, 2006 ACS/IEEE International Conference on; Jun. 26-29, 2006 pp. 19-26; Digital Object Identifier 10.1109/PERSER.2006.1652202.*

(Continued)

*Primary Examiner*—Jean B. Fleurantin
*Assistant Examiner*—Mark E Hershley
(74) *Attorney, Agent, or Firm*—Ladas & Parry LLP

(57) ABSTRACT

There is provided a method for automatic evaluation of target files, comprising the steps of building a database of reference files; for each target file, forming a training set comprising files from the database of reference files and building a test set from features of the target file; dynamically generating a learning model from the training set; and applying the learning model to the test set, whereby a value corresponding to the target file is predicted.

22 Claims, 2 Drawing Sheets

U.S. PATENT DOCUMENTS

| | | | |
|---|---|---|---|
| 2003/0205124 | A1 | 11/2003 | Foote et al. |
| 2004/0003706 | A1 | 1/2004 | Tagawa et al. |
| 2004/0088282 | A1* | 5/2004 | Xu et al. .................... 707/3 |
| 2004/0123725 | A1 | 7/2004 | Kim |
| 2004/0231498 | A1 | 11/2004 | Li et al. |
| 2005/0065976 | A1* | 3/2005 | Holm et al. ............. 707/104.1 |
| 2005/0109194 | A1 | 5/2005 | Gayama |
| 2005/0115383 | A1 | 6/2005 | Chang |
| 2005/0160107 | A1* | 7/2005 | Liang ..................... 707/100 |
| 2005/0160901 | A1 | 7/2005 | Suzuki et al. |
| 2006/0004698 | A1* | 1/2006 | Pyhalammi et al. ........... 707/2 |
| 2006/0032363 | A1 | 2/2006 | Platt |
| 2006/0059144 | A1* | 3/2006 | Canright et al. .............. 707/5 |
| 2006/0107823 | A1 | 5/2006 | Platt et al. |
| 2006/0129523 | A1* | 6/2006 | Roman et al. ................ 707/1 |
| 2006/0228005 | A1* | 10/2006 | Matsugu et al. ............ 382/116 |
| 2006/0254411 | A1 | 11/2006 | Alcalde et al. |
| 2007/0005581 | A1* | 1/2007 | Arrouye et al. ............... 707/4 |
| 2007/0174237 | A1* | 7/2007 | Wilbrink et al. .............. 707/3 |
| 2007/0239756 | A1* | 10/2007 | Li et al. .................... 707/102 |

FOREIGN PATENT DOCUMENTS

WO    WO 2004/019264    3/2004

OTHER PUBLICATIONS

Supervised principal component analysis using a smooth classifier paradigm; Perantonis, S.J.; Petridis, S.; Virvilis, V.; Pattern Recognition, 2000. Proceedings. 15th International Conference on; vol. 2, Sep. 3-7, 2000 pp. 109-112 vol. 2; Digital Object Identifier 10.1109/ICPR.2000.906028.*

Nonlinear Time Series Prediction by Weighted Vector Quantization; Lendasse, A., Francois, D., Wertz, V., Verleysen, M.; Lecture Notes in Computer Science; vol. 2657/2003 pp. 417-426; Digital Object Identifier 10.1007/3-540-44860-8_43.*

International Search Report PCT/CA2008/000481.

I.M. Mandel, et al; "Song-Level Features and Support Vector Machines For Music Classification", Internet, ISMIR 20056th International Conference on Music Information Retrieval; Sep. 11, 2005, pp. 594-599, XP00256641, London, UK; Retrieved from the Internet: URL:http://ismir2005.ismir.net/proceedings/1106.pdf (the whole document).

Nopthaisong Chakkapong et al; "Automatic Music Classification and Retreival: Experiments with Thai Music Collection", Information and Communication Technology, 2007. ICICT '07. International Conference on, IEEE, PI, Mar. 1, 2007, pp. 76-81, XP031183515; (the whole document).

N.C. Maddage, et al; "Automatic Music Classification and Summarization" IEEE Transactions on Speech and Audio Processing, IEEE Service Center, New York, NY, US, vol. 13, No. 3, May 1, 2005, pp. 441-450, XP011130085 (the whole document).

N. Scaringella, et al; "Automatic Genre Classification of Music Content A Survey", Mar. 31, 2006, IEEE Signal Processing Magazine IEEE USA, vol. 23, NR. 2, pp. 133-141; XP002566442; (the whole document).

* cited by examiner

METHOD AND A SYSTEM FOR AUTOMATIC EVALUATION OF DIGITAL FILES

FIELD OF THE INVENTION

The present invention relates to a method and a system for automatic evaluation of digital files. More specifically, the present invention is concerned with a method for dynamic hit scoring.

BACKGROUND OF THE INVENTION

A number of files classification or prediction methods have been developed over the years.

Li et al. (US 2004/0231498) present a method for music classification comprising extracting features of a target file; extracting features of a training set; and classifying music signals.

Blum et al. (U.S. Pat. No. 5,918,223) describe a method for classifying and ranking the similarity between individual audio files comprising supplying sets containing the features of classes of sound to a training algorithm yielding a set of vectors for each class of sound; submitting a target audio file to the same training algorithm to obtain a vector for the target file; and calculating the correlation distance between the vector for the target file and the vectors of each class, whereby the class which has the smallest distance to the target file is the class assigned to the target file.

Alcade et al. (U.S. Pat. No. 7,081,579, US 2006/0254411) teach a method and system for music recommendation, comprising the steps of providing a database of references, and extracting features of a target file to determine its parameter vector using a FTT analysis method. Then the distance between the target file's parameter vector and each file's parameter vector of the database of references is determined to score the target file according to the target file's distance with each file of database of references via a linear regression method.

Foote et al. (US 2003/0205124), Platt et al. (US 2006/0107823), Flannery et al. (U.S. Pat. No. 6,545,209) present methods for classifying music according to similarity using a distance measure.

Gang et al. (US 2003/0089218) disclose a method for predicting musical preferences of a user, comprising the steps of building a first set of information relative to a catalog of musical selection; building a second set of information relative to the tastes of the user; and combining the information of the second set with the information of the first set to provide an expected rating for every song in the catalog.

There is a need in the art for a method for dynamic hit scoring.

SUMMARY OF THE INVENTION

More specifically, there is provided a method for automatic evaluation of target files, comprising the steps of building a database of reference files; for each target file, forming a training set comprising files from the database of reference files and building a test set from features of the target file; dynamically generating a learning model from the training set; and applying the learning model to the test set, whereby a value corresponding to the target file is predicted.

There is further provided a method for automatic evaluation of songs, comprising the step of building a database of hit songs; for each song to be evaluated, forming a training set comprising songs from the database of hit songs and building a test set from features of the song to be evaluated; dynamically generating a learning model from the training set; and applying the learning model to the test set; whereby a score corresponding to the song to be evaluated is predicted.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

An embodiment of the method according to an aspect of the present invention generally comprises an analysis step (step 100) and a dynamic scoring step (step 200).

Figure 1:
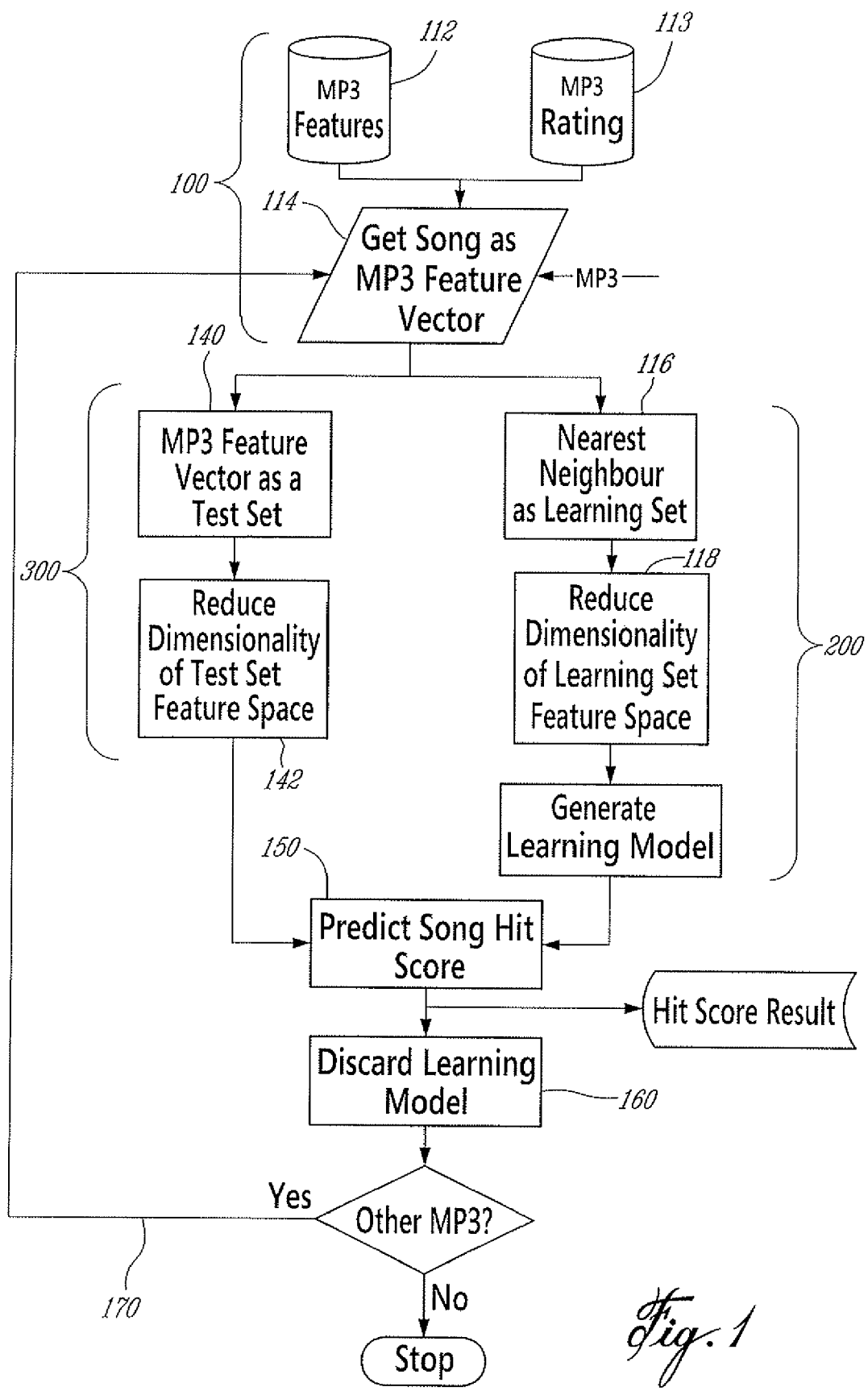
FIG. 1 is a flow chart of an embodiment of a method according to an aspect of the present invention.

The method will be described herein in the case of music files for example, in relation to the flowchart of FIG. 1.

In the analysis step (step 100), a database of reference files is built. In the case of music files, the database of reference files comprises hit songs for example.

A number of files, such as MP3 files or other digital format, for example, of songs identified as hits are gathered, and numerical features that represent each one of them are extracted to form n-dimensional vectors of numerical features that represent each file, referred to as feature vectors, as well known in the art.

A number of features, including for example timbre, rhythm, melody frequency etc, are extracted from the files to yield feature vectors corresponding to each one of them. In a hit score method, a number of 84 features were extracted for example.

The feature vectors are stored in a database along with relevant information, such as for example, artist's name, genre etc (112). Each MP3 file is rated, according to a predefined scheme, and also stored in a database (113).

The references files, here exemplified as hit songs MP3, are selected according to a predefined scheme of rating. In the case of hit songs, scoring may originate from a number of sources, including for example, compilation of top 50 rankings, sales, air play etc.

For each target file, i.e. each song to be assessed in the present example, numerical features that represent the target file are extracted to form corresponding feature vectors (114).

The dynamic scoring step (step 200) generally comprises a learning phase and a predicting phase.

In the learning phase, files from the reference database in regards to which the target file will be assessed are selected in a training set, which represents a dynamical neighborhood. The training set is built by finding n closest feature vectors of the target file's feature vector in the database of feature vectors of the hits (116). The distance/similarity between the target file's feature vector and each feature vector of the database of hits may be determined by using the Euclidian distance, the cosine distance or the Jensen-Shannon distribution similarity, as well known to people in the art.

The training set is then simplified by reducing its dimension (118), but using either Principal Component Analysis (PCA) or Singular Value Decomposition (SVD) for example or non linear regression techniques known in the art such as (but not limited to): Neural Networks, Support Vector Machines, Generalized Additive Model, Classification and Regression Tree, Multivariate Adaptive Regression Splines, Hierarchical Mixture of Experts, Supervised Principal Component Analysis.

PCA is an orthogonal linear transformation that transforms the data to a new coordinate system such that the greatest variance by any projection of the data comes to lie on the first coordinate (called the first principal component), the second greatest variance on the second coordinate, and so on. PCA can be used for dimensionality reduction in a data set while retaining those characteristics of the data set that contribute most to its variance, by keeping lower-order principal components and ignoring higher-order ones. Such low-order components often contain the "most important" aspects of the data. But this is not necessarily the case, depending on the application.

The main idea behind the principal component analysis is to represent multidimensional data with less number of variables retaining main features of the data. It is inevitable that by reducing dimensionality some features of the data will be lost. It is hoped that these lost features are comparable with the "noise" and they do not tell much about underlying population.

PCA is used to project multidimensional data to a lower dimensional space retaining as much as possible variability of the data. This technique is widely used in many areas of applied statistics. It is natural since interpretation and visualization in a fewer dimensional space is easier than in many dimensional space. Especially, dimensionality can be reduced to two or three, then plots and visual representation may be used to try and find some structure in the data.

PCA is one of the techniques used for dimension reductions, as will now be briefly described.

Suppose M is an m-by-n matrix whose entries come from the field K, which is either the field of real numbers or the field of complex numbers. Then there exists a factorization of the form $$M = U \Sigma V^*,$$

where U is an m-by-m unitary matrix over K, the matrix $\Sigma$ is m-by-n with nonnegative numbers on the diagonal and zeros off the diagonal, and V* denotes the conjugate transpose of V, an n-by-n unitary matrix over K. Such a factorization is called a singular-value decomposition of M.

The matrix V thus contains a set of orthonormal "input" or "analysing" basis vector directions for M. The matrix U contains a set of orthonormal "output" basis vector directions for M. The matrix $\Sigma$ contains the singular values, which can be thought of as scalar "gain controls" by which each corresponding input is multiplied to give a corresponding output.

A common convention is to order the values $\Sigma_{i,j}$ in non-increasing fashion. In this case, the diagonal matrix $\Sigma$ is uniquely determined by M (though the matrices U and V are not).

Assuming zero empirical mean (the empirical mean of the distribution has been subtracted from the data set), the principal component $w_1$ of a data set x can be defined as:

$$w_1 = \arg\max_{\|w\|=1} \text{var}\{w^T x\} = \arg\max_{\|w\|=1} E\{(w^T x)^2\}$$

With the first k−1 components, the k-th component can be found by subtracting the first k−1 principal components from x:

$$\hat{x}_{k-1} = x - \sum_{i=1}^{k-1} w_i w_i^T x$$

and by substituting this as the new data set to find a principal component in $$w_k = \arg\max_{\|w\|=1} E\{(w^T \hat{x}_{k-1})^2\}.$$

The PCA transform is therefore equivalent to finding the singular value decomposition of the data matrix X, $$X = W \Sigma V^T,$$

and then obtaining the reduced-space data matrix Y by projecting X down into the reduced space defined by only the first L singular vectors, $W_L$:

$$Y = W_L^T X = \Sigma_L V_L^T$$

The matrix W of singular vectors of X is equivalently the matrix W of eigenvectors of the matrix of observed covariance $C = XX^T$, $$XX^T = W\Sigma^2 W^T$$

It is often the case that different variables have completely different scaling. For examples one of the variables may have been measured in meters and another one in centimeters (by design or accident). Eigenvalues of the matrix is scale dependent. If one column of the data matrix X is multiplied by some scale factor (say s) then variance of this variable is increase by $s^2$ and this variable can dominate whole covariance matrix and hence the whole eigenvalues and eigenvectors. It is necessary to take precautions when dealing with the data. If it is possible to bring all data to the same scale using some underlying physical properties then it should be done. If scale of the data is unknown then it is better to use correlation matrix instead of the covariance matrix. It is in general a recommended option in many statistical packages.

It should be noted that since scale affects eigenvalues and eigenvectors then interpretation of the principal components derived by these two methods can be completely different. In real life applications care should be taken when using correlation matrix. Outliers in the observation can affect covariance and hence correlation matrix. It is recommended to use robust estimation for covariance (in a simple case by rejecting of outliers). When using robust estimates covariance matrix may not be non-negative and some eigenvalues might be negative. In many applications, it is not important since only the principal components corresponding to the largest eigenvalues are of interest.

In either case, the number of significant variables (principal axis or singular axis) is kept to a minimum. There are many recommendations for the selection of dimension, as follows.

i) The proportion of variances: if the first two components account for 70%-90% or more of the total variance then further components might be irrelevant (See problem with scaling above).

ii) Components below certain level can be rejected. If components have been calculated using a correlation matrix, often those components with variance less than 1 are rejected. It might be dangerous. Especially if one variable is almost independent of others then it might give rise to the component with variance less than 1. It does not mean that it is uninformative.

iii) If the uncertainty (usually expressed as standard deviation) of the observations is known, then components with variances less than that, certainly can be rejected.

iv) If scree plots (scree plot is the plot of the eigenvalues, or variances of principal components, against their indices) show elbow then components with variances less than this elbow can be rejected.

According to a cross-validation technique, one value of the observation is removed ($x_{ij}$) then, using principal components, this value is predicted and it is done for all data points. If adding the component does not improve prediction power, then this component can be rejected. This technique is computer intensive.

PCA was described above as a technique, in Step 118, for reducing dimensionality of the learning set feature space, the learning set comprising nearest neighbors from the target file.

Based on these n closest feature vectors, a learning model is dynamically generated (130), using a well-known theoretical algorithm called Support Vector Model (SVM) for example, as will now be described, using a software MCubix™ developed by Diagnos Inc. for example.

SVM is a supervised learning algorithm that has been successful in proving itself an efficient and accurate text classification technique. Like other supervised machine learning algorithms, an SVM works in two steps. In the first step—the training step—it learns a decision boundary in input space from preclassified training data. In the second step—the classification step—it classifies input vectors according to the previously learned decision boundary. A single support vector machine can only separate two classes—a positive class (y=+1) and a negative class (y=−1).

In the training step the following problem is solved. A set of training examples $S_l=\{(x_1,y_1), (x_2,y_2), \ldots, (x_l,y_l)\}$ of size l from a fixed but unknown distribution p(x,y) describing the learning task is given. The term-frequency vectors $x_i$ represent documents and $y_i=\pm 1$ indicates whether a document has been labeled with the positive class or not. The SVM aims to find a decision rule h c:x→{−1,+1} that classifies the documents as accurately as possible based on the training set $S_l$.

Figure 2:
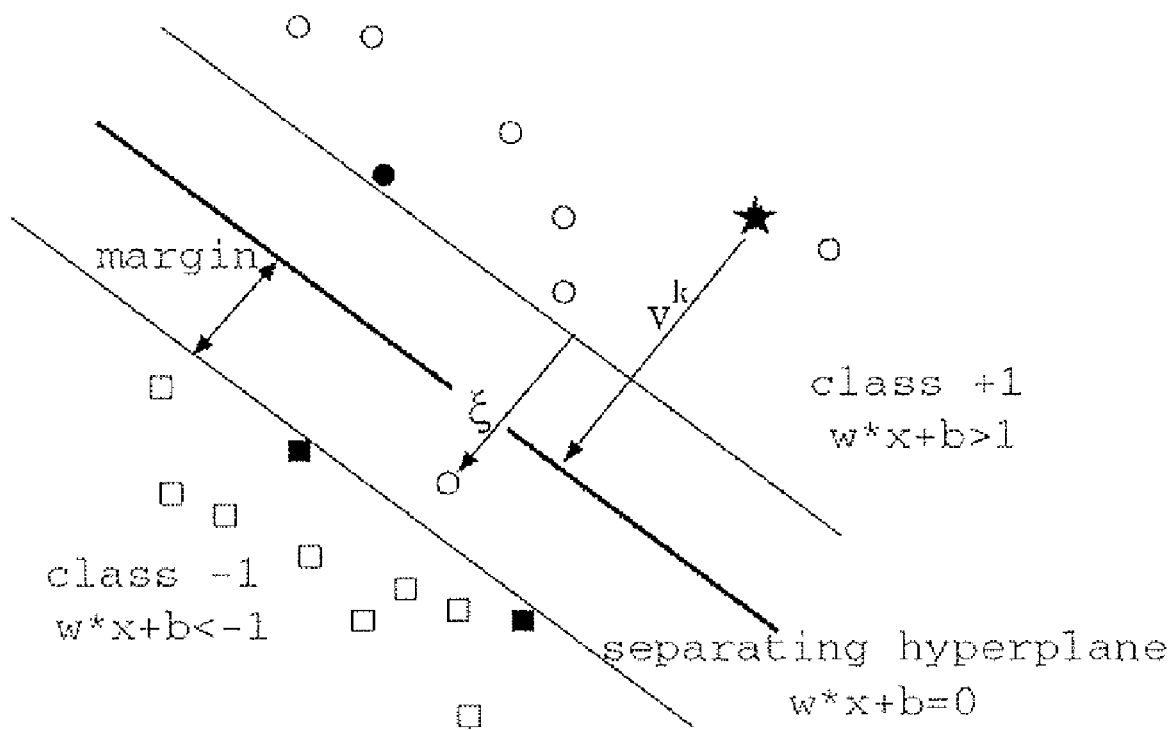
FIG. 2 illustrates a class separating hyperplane in a Support Vector Model technique used in the method of FIG. 1.

An hypothesis space is given by the functions f(x)=sgn (wx+b) where w and b are parameters that are learned in the training step and which determine the class separating hyperplane, shown in FIG. 2. Computing this hyperplane is equivalent to solving the following optimization problem:

$$\text{minimize: } V(w, b, \xi) = \frac{1}{2}ww + C\sum_{i=1}^{l}\xi_i$$

$$\text{subject to: } V(w, b, \xi) = \frac{1}{2}ww + C\sum_{i=1}^{l}\xi_i$$

The constraints require that all training examples are classified correctly, allowing for some outliers symbolized by the slack variables $\xi_i$. If a training example lies on the wrong side of the hyperplane, the corresponding $\xi_i$ is greater than 0. The factor C is a parameter that allows for trading off training error against model complexity. In the limit C→∞ no training error is allowed. This setting is called hard margin SVM. A classifier with finite C is also called a soft margin Support Vector Machine. Instead of solving the above optimization problem directly, it is easier to solve the following dual optimisation problem:

$$W(\alpha) = -\sum_{i=1}^{l} \alpha_i + \frac{1}{2}\sum_{i=1}^{l}\sum_{j=1}^{l} y_i y_j \alpha_i \alpha_j x_i x_j$$

minimize $$\sum_{i=1}^{l} y_i \alpha_i = 0$$

subject to: $0 \le \alpha_i \le C$

All training examples with $\alpha_i>0$ at the solution are called support vectors. The Support vectors are situated right at the margin (see the solid circle and squares in FIG. 2) and define the hyperplane. The definition of a hyperplane by the support vectors is especially advantageous in high dimensional feature spaces because a comparatively small number of parameters—the α in the sum of equation—is required.

SVM have been introduced within the context of statistical learning theory and structural risk minimization. In the methods one solves convex optimization problems, typically quadratic programs. Least Squares Support Vector Machines (LS-SVM) are reformulations to standard SVM. LS-SVM are closely related to regularization networks and Gaussian processes but additionally emphasize and exploit primal-dual interpretations. Links between kernel versions of classical pattern recognition algorithms such as kernel Fisher discriminant analysis and extensions to unsupervised learning, recurrent networks and control also exist.

In order to make an LS-SVM model, two hyper-parameters are needed, including a regularization parameter γ, determining the trade-off between the fitting error minimization and smoothness, and the bandwidth $\sigma^2$, at least in the common case of the RBF kernel. These two hyper-parameters are automatically computed by doing a grid search over the parameter space and picking the minimum. This procedure iteratively zooms to the candidate optimum.

As the learning model is thus generated (130), in the predicting phase (300), a test set is built from the features of the target file (140), and the test set feature space dimensionality is reduced (142) as known in the art, by using a technique such as Principal component analysis (PCA) or Singular Value Decomposition (SVD), keeping the same number of significant variables (principal axis or singular axis) as the number of significant variables used in the learning set, as described hereinabove.

Then, the learning model generated in step 130 is applied to the test set, so as to determine a value corresponding to the target song (150). The rating of the target file is based on the test set and the learning set, the target file being assessed relative to the training set.

A storing phase may further comprise storing the predicted values in a result database.

The learning model is discarded after prediction for the target file (160), before the method is applied to another file to be evaluated (170).

As new files (hit songs) in the database of reference file appear, the training set is rebuilt by updating the closest neighbours and hyper-parameters are automatically updated, resulting in a dynamic scoring method.

As people in the art will appreciate, the present method allows an automatic learning on a dynamic neighborhood.

As exemplified hereinabove, the method may be used for pre-selecting songs in the contest of a hit contest for example, typically based on the popularity of the songs.

Depending on a nature of the scale used for evaluation, the present adaptive method may be applied to evaluate a range of type of files, i.e. compression format, nature of files etc. . . . with an increased accuracy in highly non-linear fields, by providing a dynamic learning phase.

Although the present invention has been described hereinabove by way of embodiments thereof, it may be modified, without departing from the nature and teachings of the subject invention as defined in the appended claims.

The invention claimed is:

1. A method for automatic ranking of target files according to a predefined scheme, comprising the steps of:
   building a database of reference files already ranked according to the predefined scheme;
   for each target file:
   i) determining a neighborhood of the target file among the reference files in the database of reference files, and forming a training set comprising reference files of this neighborhood, versus which neighborhood as a whole the target file is to be assessed, wherein said step of forming a training set comprises extracting a feature vector of the target file and finding n closest neighbors of the feature vector of the target file among features vectors in the database of reference files, and wherein said finding n closest neighbors comprises using one of: i) Euclidean distance, ii) cosine distance and iii) Jensen-Shannon distribution similarity;
   ii) building a test set from features of the target file;
   iii) dynamically generating a learning model from the training set, the learning model defining a correlation between the reference files in the training set and a rank thereof according to the predefined scheme; and
   iv) applying the learning model to the test set;
   whereby a rank corresponding to the target file is predicted according to the predefined scheme.

2. The method of claim 1, further comprising storing the predicted rank in a result database.

3. The method of claim 1, wherein said step of building a database of reference files comprises collecting files previously ranked according to the predefined scheme, under a digital format; obtaining feature vectors of each of the collected files; and storing the feature vectors in a database of reference files.

4. The method of claim 3, wherein said step of building a database of reference files further comprises storing a rank, defined according to the predefined scheme, of each of the reference files in a score database.

5. The method of claim 3, wherein said step of obtaining feature vectors of each of the collected files comprises extracting, from the collected files, a number of features to yield reference feature vectors.

6. The method of claim 3, wherein said step of storing the feature vectors in a database of reference files comprises storing the feature vectors along with information about the corresponding reference files.

7. The method of claim 1, wherein said step of forming a training set comprising files from the database of reference files and building a test set from features of the target file further comprises reducing the dimensionality of the training set and reducing the dimensionality of the test set.

8. The method of claim 7, wherein said steps of reducing the dimensionality are done by using one of: i) Principal Component Analysis (PCA) and ii) Singular Value Decomposition (SVD).

9. The method of claim 7, wherein said steps of reducing the dimensionality are done by a non-linear regression technique.

10. The method of claim 7, wherein said steps of reducing the dimensionality are done by one of: Neural Networks, Support Vector Machines, Generalized Additive Model, Classification and Regression Tree, Multivariate Adaptive Regression Splines, Hierarchical Mixture of Experts and Supervised Principal Component Analysis.

11. The method of claim 1, wherein said step of dynamically generating a learning model comprises using closest neighbors of the target file in the database of reference files.

12. The method of claim 1, wherein said step of dynamically generating a learning model comprises using the n closest neighbors of the target file's feature vector among the feature vectors in the database of reference files.

13. The method of claim 1, wherein said step of dynamically generating a learning model comprises reducing the dimension of a set formed of the closest neighbors of the target file in the database of reference files.

14. The method of claim 1, wherein said step of dynamically generating a learning model comprises reducing the dimension of a set formed of the closest neighbors of the target file in the database of reference files.

15. The method of claim 1, wherein said step of dynamically generating a learning model comprises applying a Support Vector Model.

16. The method of claim 1, wherein said step of dynamically generating a learning model comprises applying a Support Vector Model to the n closest neighbors of the target file's feature vector in the database of reference files.

17. The method of claim 1, further comprising discarding the learning model after prediction for the target file.

18. The method of claim 1, wherein said step of building a training set comprises rebuilding the training set as new ranked files appear in the database of reference files.

19. The method of claim 1, wherein said step of forming a training set comprises finding new closest neighbors in the database of reference files as new reference files appear in the database of reference files.

20. The method of claim 1, wherein said step of forming a training set comprises updating the closest neighbors as new reference files appear in the database of reference files.

21. The method of claim 1, wherein said step of generating a learning model comprises automatically generating a learning model based on a dynamic neighborhood of the target file as represented by the training set.

22. The method of claim 1, wherein the target files are song files, the reference files are songs previously ranked according to the predefined scheme, and the target files are assessed according to the previously ranked songs.

* * * * *